United States Patent [19]

Fukui et al.

[11] Patent Number: 5,742,837
[45] Date of Patent: Apr. 21, 1998

[54] METHOD AND APPARATUS FOR DOCUMENT FORMATTING WITH EFFICIENT FIGURE ELEMENT LAYOUT MANIPULATION

[75] Inventors: Mika Fukui; Isamu Iwai, both of Kanagawa-ken; Koji Yamaguchi, Tiba-ken; Miwako Doi, Kanagawa-ken, all of Japan

[73] Assignee: Kabushiki Kaisha Toshiba, Kawasaki, Japan

[21] Appl. No.: 296,465

[22] Filed: Aug. 26, 1994

Related U.S. Application Data

[63] Continuation of Ser. No. 623,552, Dec. 7, 1990, Pat. No. 5,517,621.

[30] Foreign Application Priority Data

Dec. 7, 1989 [JP] Japan ................... 1-316481

[51] Int. Cl.⁶ ............................................. G06F 17/00
[52] U.S. Cl. ............................................. 395/779
[58] Field of Search ..................... 395/148, 144–147, 395/149, 157, 779–783

[56] References Cited

U.S. PATENT DOCUMENTS

| | | | |
|---|---|---|---|
| 4,949,287 | 8/1990 | Yamaguchi et al. | 395/782 |
| 5,031,121 | 7/1991 | Iwai et al. | 395/777 |
| 5,051,930 | 9/1991 | Kuwabara et al. | 395/778 |
| 5,119,491 | 6/1992 | Iwai et al. | 395/774 |
| 5,151,975 | 9/1992 | Shiraki et al. | 395/782 |
| 5,179,650 | 1/1993 | Fukui et al. | 395/782 |
| 5,214,755 | 5/1993 | Mason | 395/782 |
| 5,291,602 | 3/1994 | Barker et al. | 395/786 |

FOREIGN PATENT DOCUMENTS

| | | |
|---|---|---|
| 0 241 646 | 10/1987 | European Pat. Off. . |
| 0 328 900 | 8/1989 | European Pat. Off. . |

OTHER PUBLICATIONS

Cavuoto et al., Inside Xerox Ventura Publisher, pp. 313–321, Jan. 1989.

Acerson, "WordPerfect® Series 5 Edition", Jan. 1988, pp. 91, 92, 429–434.

Kinata et al., "Working with Word" Second Edition; 1988–89; pp. 461, 529–543.

Primary Examiner—Joseph R. Burwell
Attorney, Agent, or Firm—Foley & Lardner

[57] ABSTRACT

A method and an apparatus for document formatting, capable of reflecting the preference of the operator and overall balance, such that the desired formatting can be obtained efficiently without tedious post-processing operations. In the apparatus, document data representing the document, including figure data representing figure elements of the document, and region data indicating layout regions to which the document is to be laid out, are inputted, candidate layouts for each figure element to be laid out are generated, one of the generated candidate layouts is selected, and the document is formatted in the layout region, according to the selected one of the candidate layouts.

10 Claims, 19 Drawing Sheets

FIG.2 (A)

TEXT DATA

On the document
formatting apparatus ②

T.Yamada  T.Kanda ②

Aoshiba K.K. R&C Center ②
1.Introduction ②
  In a conventional document
  formatting appuratus ……

2.System configuration ②
  A configuration of this system
  is shown in FIG.1 ………

FIG.2 (B)

FIGURE DATA

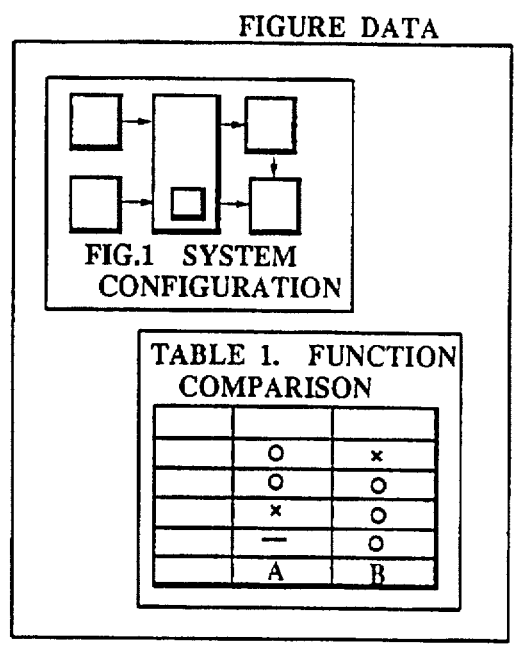

FIG.3

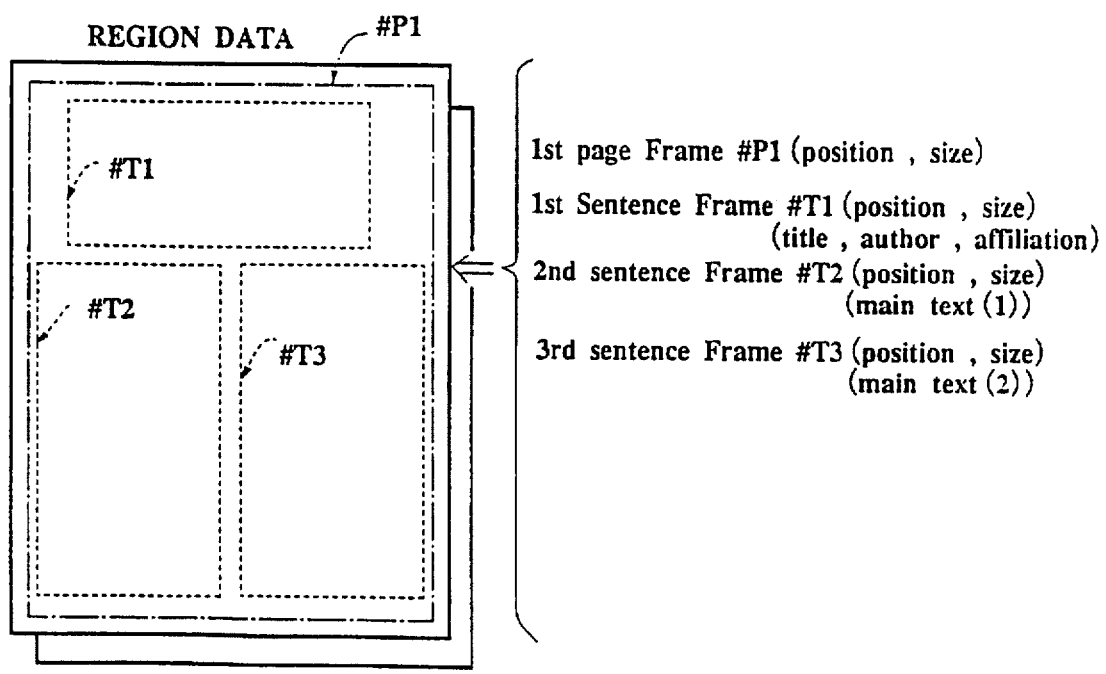

REGION DATA   #P1

1st page Frame #P1 (position , size)

1st Sentence Frame #T1 (position , size)
              (title , author , affiliation)
2nd sentence Frame #T2 (position , size)
              (main text (1))
3rd sentence Frame #T3 (position , size)
              (main text (2))

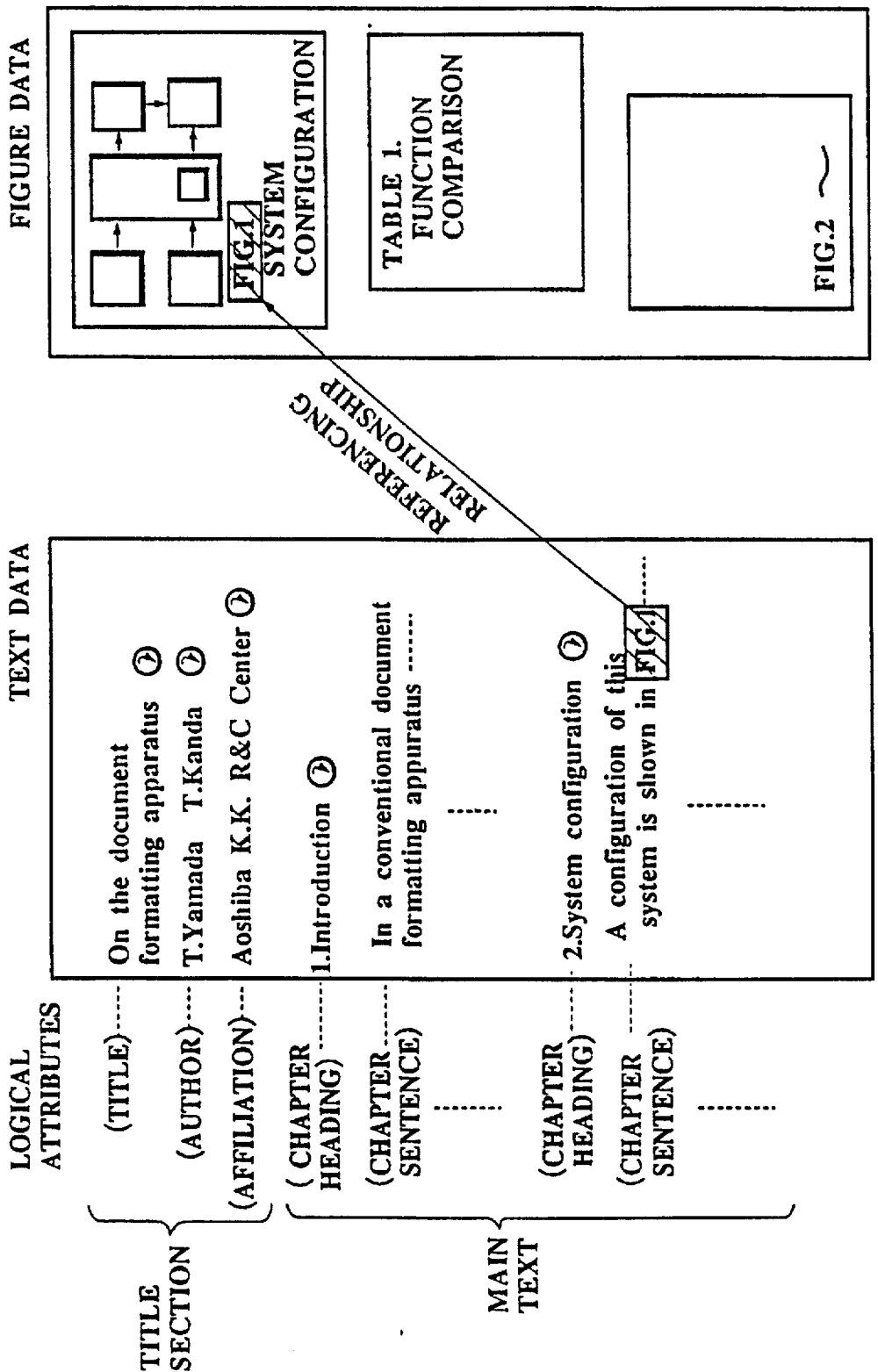

FIG.6

1st Page Frame (position , size)

(1st Sentence Frame (position , size)
        (preceding Sentence Frame : None)
        (Following Sentence Frame : None)
        (Title (position , size)
            ∫
        )
    2nd Sentence Frame (position , size)
        (Preceding Sentence Frame : None)
        (Following Sentence Frame : None)
        (1st Chapter Heading (position, size)
            ∫
      )
    3rd Sentence Frame (position , size)
        (Preceding Sentence Frame : 2nd Sentence Frame)
        (Following Sentence Frame : 2nd Page 1st sentence Frame)
        (1st Chapter Sentence 4 (position , size)
            ∫
        2nd Chapter Heading (position , size)
        2nd Chapter Sentence 1 (position , size)
          )        (Referring FIG.1 , Line (position , size))
    )

FIG.8

<RULES FOR LAYOUT WITH RESPECT TO PAGE FRAME>
(Condition P1 (Length=Less than half) (Width=Less than half)
  ⇒ Candidates (Upper left corner) (upper right corner)
             (Lower left corner) (Lower right corner))

(Condition P2 (Length=More than half) (Width=Half to same)
  ⇒ Candidates (Top center) (Bottom center))

<RULES FOR LAYOUT WITH RESPECT TO SENTENCE FRAME>
(Condition T1 (Length=less than half) (width=Less than half)
  ⇒ Candidates (Upper left comer) (Upper right corner)
             (Lower left corner) (Lower right corner)
(Condition T2 (Length=Less than half) (Width=Half to same)
  ⇒ Candidates (Top center) (Bottom center))

<RULES FOR LAYOUT IN RELATION TO ALREADY LAID
 OUT FIGURE ELEMENT>

(Condition F1 (Length=Less than half) (Width=Less than half)
  ⇒ Candidates (Lower left) (Right) (Below right) (Lower right))
(Condition F2 (Length=Less than half) (Width=Half to same)
  ⇒ Candidates (Below center) (Upper right) (Lower right))

(UPPER LEFT)

(UPPER RIGHT)

(LOWER LEFT)

(LOWER RIGHT)

(TOP CENTER)

(BOTTOM CENTER)

(BELOW CENTER)

(UPPER RIGHT)

(LOWER RIGHT)

(UPPER LEFT)

(UPPER RIGHT)

(LOWER LEFT)

(LOWER RIGHT)

(TOP CENTER)

(BOTTOM CENTER)

(LOWER LEFT)

TOO NARROW (LOWER RIGHT)

TOO NARROW

FIG.15

> LAYOUT RESULT
> EVALUATION ITEMS

☐ ① Is it placed within the page frame ?
☐ ② Is it not overlapping with the previously
    laid out figure element ?
☐ ③ Is it not overlapping with the other sentence
    frames assigned to different logical attributes ?
☐ 4 Can the referencing phrase be placed on the same page ?
☐ 5 Is it not placed at a position where the order of figure elements
    is reversed, with respect to the previously laid out figure element ?
☐ 6 Is it not dividing the sentence frame in parts ?
☐ 7 In a case a remaining space of the sentence frame on that page
    is small, is it placed at a bottom of that sentence frame containing
    the referencing phrase?

FIG.19

| CANDIDATE LAYOUT | | UPPER LEFT | UPPER RIGHT | LOWER LEFT | LOWER RIGHT | TOP CENTER | BOTTOM CENTER |
|---|---|---|---|---|---|---|---|
| 1ST RATE | ① | ○ | ○ | ○ | ○ | ○ | ○ |
| | ② | ○ | ○ | ○ | ○ | ○ | ○ |
| | ③ | | | ○ | ○ | ○ | ○ |
| 2ND RATE | 4 | ○ | ○ | ○ | ○ | ○ | ○ |
| | 5 | ○ | ○ | ○ | ○ | ○ | ○ |
| | 6 | ○ | ○ | ○ | ○ | ○ | ○ |
| | 7 | | | | ○ | | ○ |
| | ∫ | ∫ | ∫ | ∫ | ∫ | ∫ | ∫ |
| ORDER OF PREFERENCE | | — | — | 4 | 3 | 2 | 1 |

FIG.20

RULES FOR
CANDIDATE ORDER DETERMINATION

1, $\begin{pmatrix} \text{LAYOUT IN RELATION} \\ \text{TO ALREADY LAID} \\ \text{OUT FIGURE ELEMENT} \end{pmatrix} > \begin{pmatrix} \text{LAYOUT WITH} \\ \text{RESPECT TO} \\ \text{SENTENCE FRAME} \end{pmatrix} > \begin{pmatrix} \text{LAYOUT WITH} \\ \text{RESPECT TO} \\ \text{PAGE FRAME} \end{pmatrix}$ 2, The candidate layouts belonging to the same category are ordered by a number of second rate evaluation items satisfied by each candidate layout.

FIG.23

On the document
formatting apparatus

T.Yamada  T.Kanda

Aoshiba K.K. R&C Center

1.Introduction
   In a conventional
   document formatting
   apparatus

2.System configuration
   A configuration of
   this system is
   shown in FIG.1

METHOD AND APPARATUS FOR DOCUMENT FORMATTING WITH EFFICIENT FIGURE ELEMENT LAYOUT MANIPULATION

This application is a continuation of application Ser. No. 07/623,552, now U.S. Pat. No. 5,517,621, filed Dec. 7, 1990.

BACKGROUND OF THE INVENTION

1. Field of the Invention

The present invention relates to a method and an apparatus for formatting a document including both figure data and text data.

2. Description of the Background Art

In a document formatting apparatus, a document represented by document data, including text data and figure data, is formatted appropriately into a specified format according to region data specifying regions at which the document data are to be laid out. In this formatting operation, highly sophisticated knowledge data are necessary in order to achieve the most suitable layout, with appropriate consideration for various aspects such as an amount of data to be laid out, semantic relationships among the data, and an overall balance of each page.

However, in a conventional document formatting apparatus, sufficiently sophisticated knowledge data have been missing, so that determination of the arrangement of the data and margins have depended largely on empirically acquired skills or the patience of an experienced operator.

One conventional document formatting system determines the arrangement of the data automatically by utilizing the referential relationships between the text data and the figure data, but the arrangement obtainable in such a system is inflexible, and ignores any preference of the operator and an overall balance.

In such a conventional document formatting apparatus, if a manual operation type, the arrangement of data and margins have to be specified manually, so that the amount of operations required becomes enormous, and efficiency is very low, if it is an automatic operation type, the preference of the operator and overall balance are completely ignored, so that tedious post-processing manual correction and modification operations are indispensable, and, as a result, the efficiency is also very low.

SUMMARY OF THE INVENTION

It is, therefore, an object of the present invention to provide a method and apparatus for document formatting, capable of reflecting the preference of the operator and the overall balance, such that the desired formatting can be obtained efficiently without tedious post-processing operations.

According to one aspect of the present invention, there is provided an apparatus for formatting a document, comprising means for inputting document data representing the document, including figure data representing figure elements of the document, and region data indicating a layout region which the document is to be laid out. A means for generating candidate layouts for each figure element to be laid out. A means for selecting one of the candidate layouts generated by the generating means, and means for formatting the document in the layout region according to the selected one of the candidate layouts.

According to another aspect of the present invention there is provided a method of formatting a document, comprising the steps of inputting document data representing the document, including figure data representing figure elements of the document, and region data indicating layout region to which the document is to be laid out; generating candidate layouts for each figure element to be laid out; selecting one of the candidate layouts generated at the generating step; and formatting the document in the layout region, according to the selected one of the candidate layouts.

Other features and advantages of the present invention will become apparent from the following description taken in conjunction with the accompanying drawings.

BRIEF DESCRIPTION OF THE DRAWINGS

FIGS. 2(A) and 2(B) are illustrations of text data and figure data as an example of a document to be formatted by the apparatus of FIG. 1.

FIG. 3 is an illustration of region data as an example of a document to be formatted by the apparatus of FIG. 1.

FIG. 4 is an illustration of the text data and figure data of FIGS. 2(A) and 2(B) showing logical attributes and referencing relationships appearing in the document.

FIG. 6 is an illustration of information on the current status of layout of the document, obtained by a layout status monitoring unit of the apparatus of FIG. 1.

FIG. 8 is a table of rules for a layout with respect to a page frame, a layout with respect to a sentence frame, and a layout in relation to already laid out figure element, to be used by the layout position candidate generation unit of the apparatus of FIG. 1.

FIG. 15 is a table of evaluation items used by the layout status evaluation unit of the apparatus of FIG. 1.

FIG. 19 is a table summarizing a result of evaluation for the candidate layouts of FIGS. 13(A), 13(B), 13(C), 13(D), 13(E) and 13(F), by the layout status evaluation unit of the apparatus of FIG. 1, using the evaluation items in the table of FIG. 15.

FIG. 20 is a table of rules for determining order of preference among the candidate layouts used by a candidate order determination unit of the apparatus of FIG. 1.

FIG. 23 is an illustration of a display for a candidate layout selection operation, displaying the candidate layouts in a form of line frames over a display of already laid out document data.

DETAILED DESCRIPTION OF THE PREFERRED EMBODIMENTS

Figure 1:
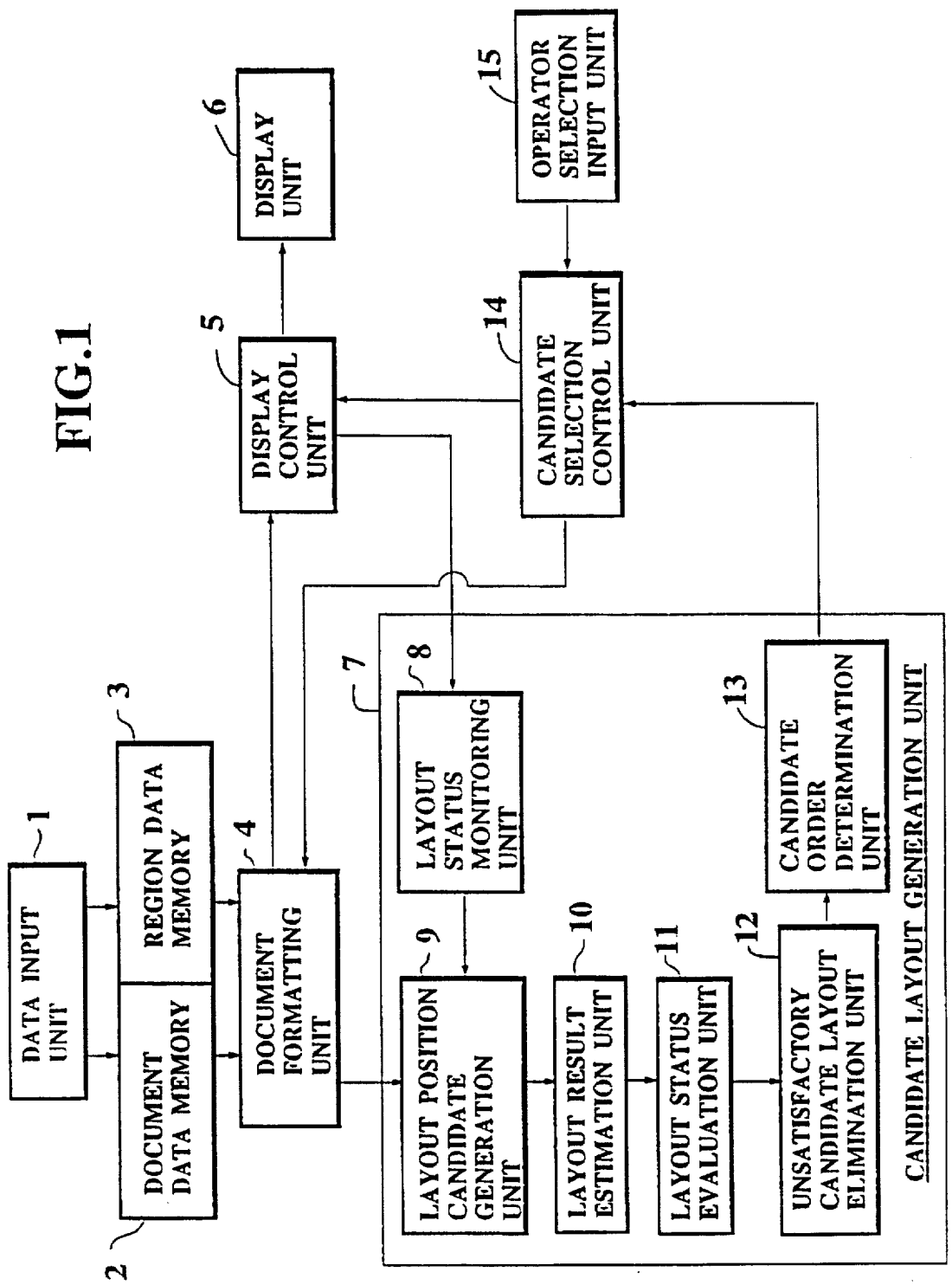
FIG. 1 is a block diagram of one embodiment of a document formatting apparatus according to the present invention.

Referring now to FIG. 1, one embodiment of a document formatting apparatus according to the present invention will be described in detail.

This document formatting apparatus comprises: a data input unit 1 for entering input data; a document data memory unit 2 and a region data memory unit 3 for storing document data and region data of the input data, respectively; a document formatting unit 4 for formatting a document given by the input data; a display control unit 5 and a display unit 6 for displaying the formatted document obtained by the document formatting unit 4; a candidate layout generation unit 7 for generating candidates for a layout of the document data; a candidate selection control unit 14 for facilitating a selection of a candidate for a layout to be made by an operator on the display unit 6; and an operator selection input unit 15 for allowing the operator to indicate his selection of a candidate for a layout.

The candidate layout generation unit 7 further comprises: a layout status monitoring unit 8, connected to the display control unit 5, for monitoring a current status of the layout of the document data; a layout position candidate generation unit 9 for generating candidate positions for a next figure element to be laid out; a layout result estimation unit 10 for estimating the layout resulting from the candidate positions generated by the layout position candidate generating unit 9; a layout status evaluation unit 11 for evaluating the layout estimated by the layout result estimation unit 10; an unsatisfactory candidate layout elimination unit 12 for eliminating unsatisfactory candidate layouts; and a candidate order determination unit 13, connected to the candidate selection control unit 14, for determining an order of preference among the candidate layouts.

In this configuration, the document data, including text data representing sentences of the document and figure data representing drawings and tables of the document as well as the region data including information on a position and a size of a page and a frame for a laying out the document data, are entered from the data input unit 1. This unit is equipped with devices such as a keyboard, a mouse, and an image scanner. The document data and the region data entered from the data input unit 1 are stored in the document data memory unit 2 and the region data memory unit 3, respectively.

In formatting the document given by the document data, the document data and the region data stored in the document data memory unit 2 and the region data memory unit 3 are fed to the document formatting unit 4 in which the document data are formatted according to the region data.

The document data formatted by the document formatting data 4 are sent to the display control unit 5 so as to have the formatted document displayed on the display unit 6 for inspection by the operator.

In this process of formatting, whenever the figure data appear in the document data, the document formatting unit 4 activates the candidate layout generation unit 7. This candidate layout generation unit 7 generates the candidate positions for laying out the drawings and tables given by the figure data among the sentences given by the text data by an analysis performed by the layout position candidate generation unit 9 on the current status of the layout of the document data obtained by the layout status monitoring unit 8.

The layout result estimation unit 10 estimates the layout resulting from each candidate position, and the layout status evaluation unit 11 evaluates the estimated layout according to prescribed evaluation items. The candidate layout elimination unit 12 eliminates those candidate layouts whose evaluation by the layout status evaluation unit 11 are unsatisfactory according to the prescribed evaluation items, and the candidate order determination unit 13 determines the order of preference among the remaining candidate layouts according to the evaluation obtained by the layout status evaluation unit 11.

The candidate layouts thus generated by the candidate layout generation unit 7 are sent through the candidate selection control unit 14 to the display control unit 5, so as to have the generated candidate layouts displayed on the display unit 6 along with the order of preference determined by the candidate order determination unit 13.

The operator enters his choice of the desired layout from the displayed list of the candidate layouts, through the operator selection input unit 15. The operator's selection is communicated to the candidate selection control unit 14, from which the selected layout is fed to the document formatting unit 4 which continues its formatting operation by using the selected layout.

Thus, in this apparatus, the layout of the drawings and tables given by the figure data among the sentences given by the text data are determined according to the operator's selection of the desired layout out of the automatically generated candidate layouts, so that it is possible to format the document in a manner which reflects the preference of the operator and the overall balance. Thus, the desired formatting can be obtained efficiently without tedious post-processing operations in this apparatus.

The operation of this apparatus will now be described in detail for a case of formatting a specific example of a document.

In the following, an example of a document to be formatted is given by the document data comprising a text data shown in FIG. 2(A) and a figure data shown in FIG. 2(B), and the region data shown in FIG. 3.

The text data shown in FIG. 2(A) includes logical attributes such as a title, an author, an affiliation, a chapter heading, and a chapter sentence, which are classified to be analyzable by a structural analysis or an analysis operation of the operator to identify an attribute of each sentence.

The figure data shown in FIG. 2(B) contains drawings and tables to be incorporated into the sentences given by the text data.

The logical attributes in the text data of FIG. 2(A) are shown in detail in FIG. 4. In addition, the referencing relationship between the text data of FIG. 2(A) and the figure data of FIG. 2(B) indicated by an arrow in FIG. 4 is also contained in the text data and the figure data.

The region data shown in FIG. 3 contains information for each page regarding a position and a size of a page frame #P1 as well as positions and sizes of sentence frames #T1, #T2, and #T3 inside the page frame #P1. In addition, there is also provided data for each sentence frame in which logical attributes, a format and an order of arrangement for sentences to be laid out inside this sentence frame are tabulated. Thus, in the region data shown in FIG. 3, the sentence frame #T1 is assigned to the title, author, and affiliation, in this order, while the sentence frames #T2 and #T3 are assigned to the main text given by the chapter headings and chapter sentences. In formatting the document given by the document data of FIGS. 2(A) and 2(B), the document formatting unit 4 lays out the sentences given by the text data according to the logical attributes assigned to each sentence frame, in an order assigned to each sentence frame.

Figure 5:
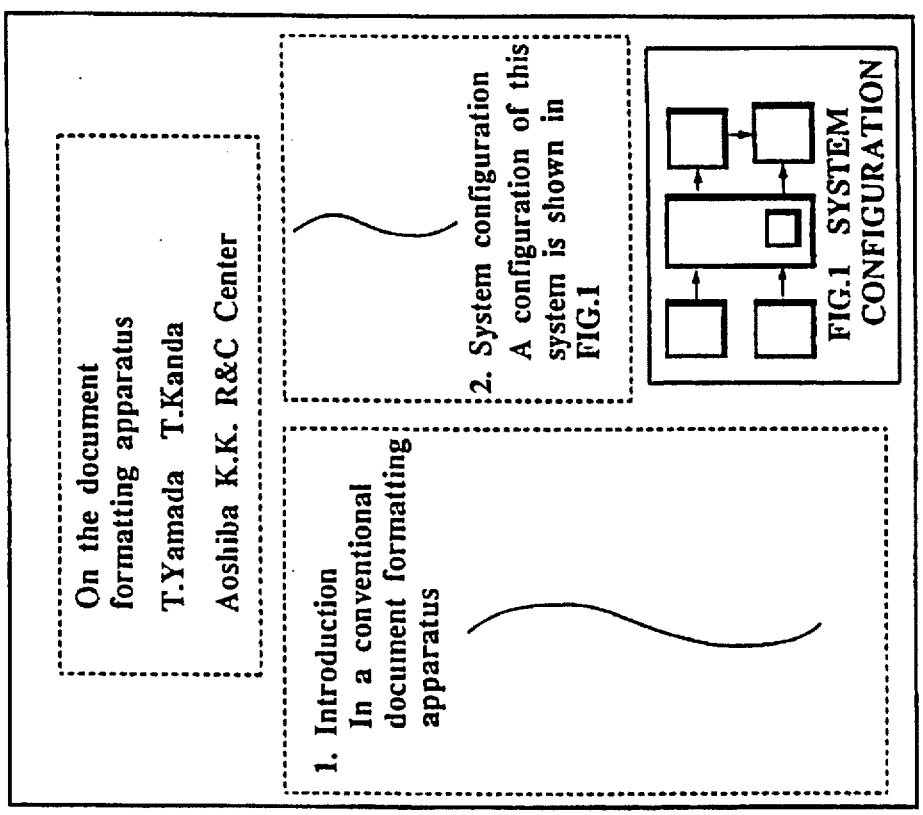
FIGS. 5(A) and 5(B) are illustrations of the example of the document to be formatted, at two stages in a document formatting process performed by the apparatus of FIG. 1.
Figure 5:
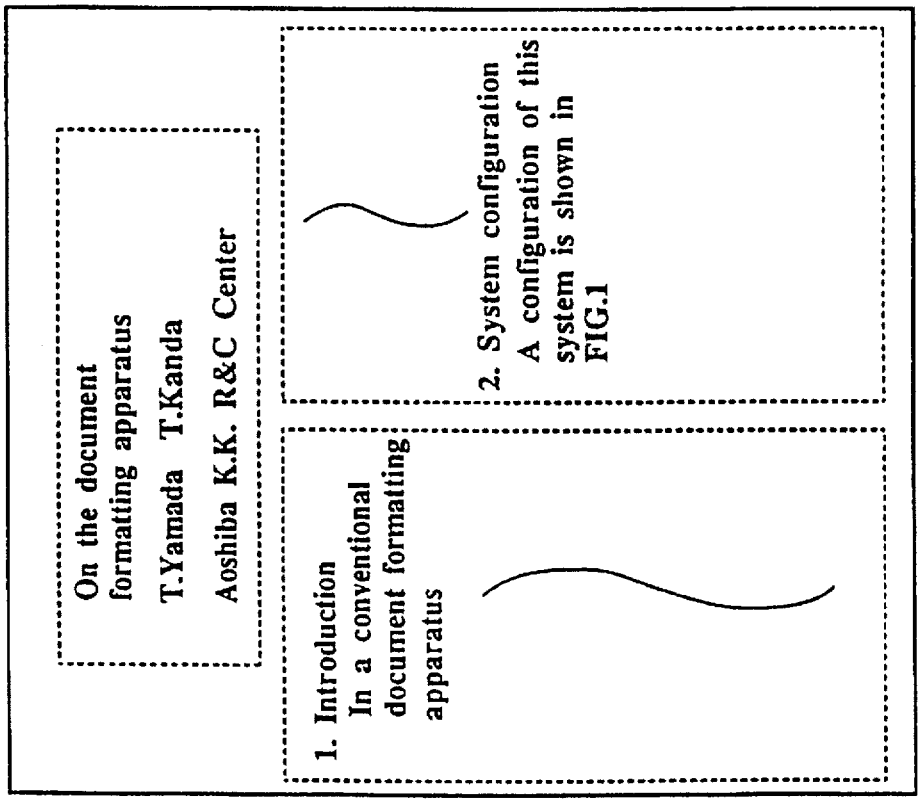

Thus, when the input data including the document data of FIGS. 2(A) and 2(B), and the region data of FIG. 3 are entered, the document formatting unit 4 lays out the sentences carrying the logical attributes of the title, author, and affiliation into the sentence frame #T1 using the specified format, while laying out the sentences carrying the logical attributes of the chapter heading and chapter sentence into the sentence frames #T2 and #T3, as shown in FIG. 5(A).

When this process reaches a referencing phrase "FIG. 1" of the text data as shown in FIG. 5(A), the candidate layout generation unit 7 is activated in order to determine the appropriate layout for "FIG. 1" of the figure data, such as that shown in FIG. 5(B), as follows.

First, the layout status monitoring unit 8 obtains the current status of the layout determined so far, in a form of data shown in FIG. 6. Namely, the data of FIG. 6 contains information regarding a position and a size of each page frame, a position and a size of each sentence frame inside each page frame, names of the immediately preceding and immediately following sentence frames for the same logical attributes, a position and a size of each sentence in each sentence frame, and a referencing relationship. Also, the layout status monitoring unit 8 obtains a size of "FIG. 1" to be laid out, from the document formatting unit 4.

Figure 7:
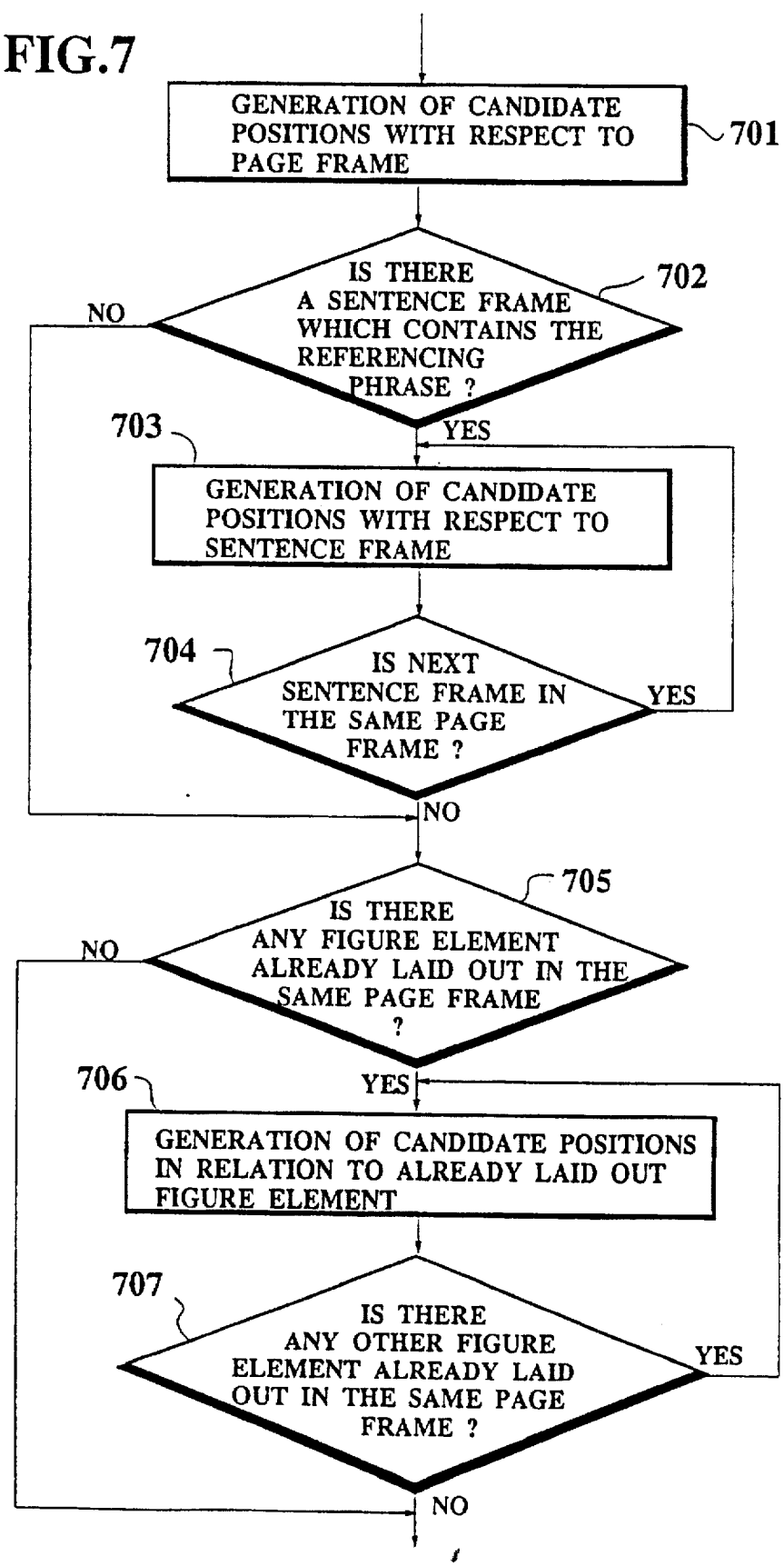
FIG. 7 is a flow chart for a candidate layout position generation operation by a layout position candidate generation unit of the apparatus of FIG. 1.
Figure 9:
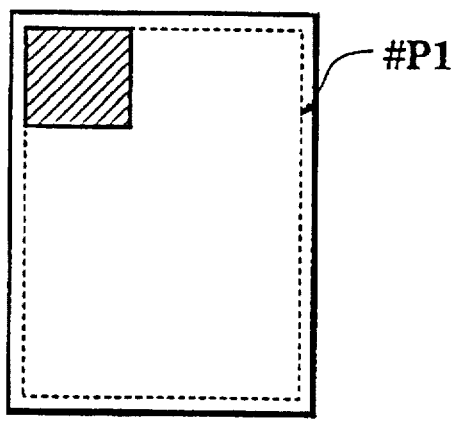
FIGS. 9(A), 9(B), 9(C), and 9(D) are illustrations of examples of candidate layout positions with respect to the page frame, generated by the layout position candidate generation unit of the apparatus of FIG. 1.
Figure 9:
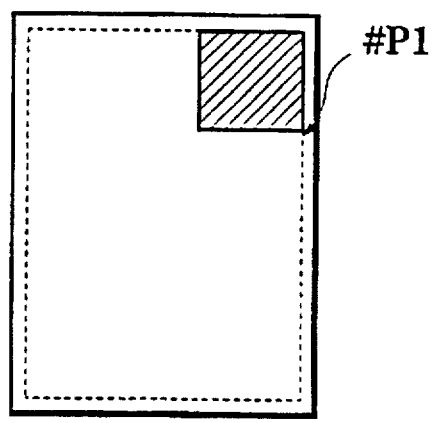
Figure 9:
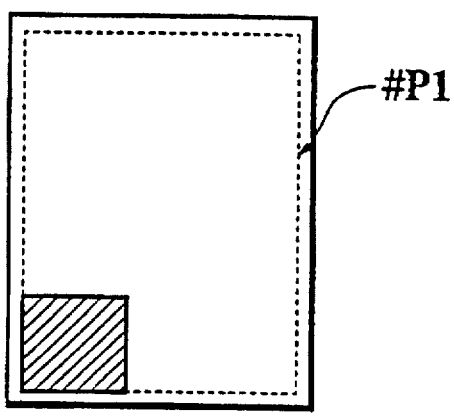
Figure 9:
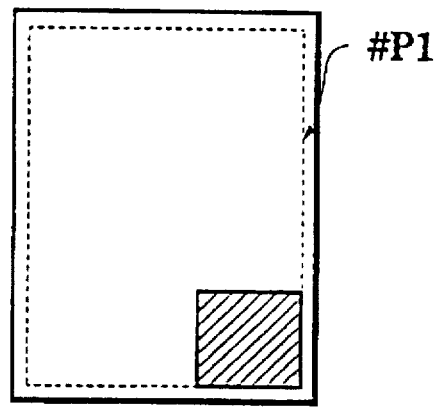

The layout position candidate generation unit 9 then generates the candidate positions for laying "FIG. 1" out, using the information obtained by the layout status monitoring unit 8, according to the flow chart of FIG. 7, as follows.

First, at the step 701, candidate positions for "FIG. 1" are generated by comparing the size of "FIG. 1" and the size of the page frame, according to a set of rules for layout with respect to a page frame shown in FIG. 8. In the case of "FIG. 1", the size of this "FIG. 1" is less than a half of that of the page frame #P1 both in length and width, which matches with the condition P1, so that there are four candidate positions of an upper left corner, an upper right corner, a lower left corner, and a lower right corner, as shown in FIGS. 9(A), 9(B), 9(C), and 9(D), respectively, where the candidate positions appear shaded.

Next, at the step 702, a sentence frame containing a referencing phrase for "FIG. 1" is searched. If such a sentence frame cannot be found, the process goes to the step 705 to be described below. Otherwise, when such a sentence frame is found, the step 703 is taken next.

Figure 10:
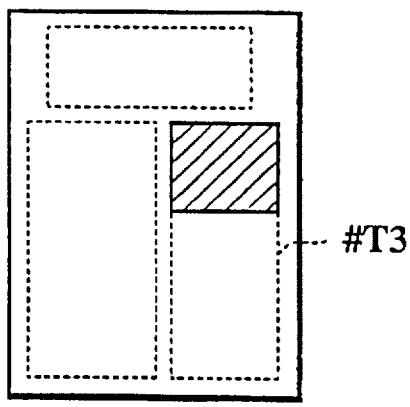
FIGS. 10(A) and 10(B) are illustrations of examples of candidate layout positions with respect to the sentence frame, generated by the layout position candidate generation unit of the apparatus of FIG. 1.
Figure 10:
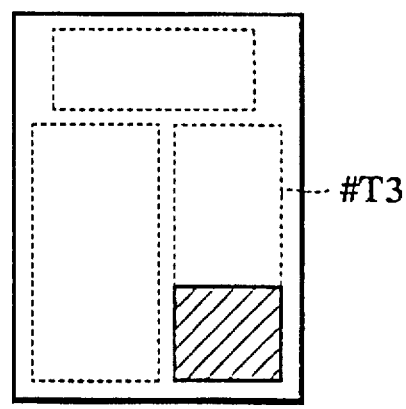

At the step 703, the candidate positions in that sentence frame are generated, by comparing the size of "FIG. 1" and the size of that sentence frame, according to a set of rules for layout with respect to a sentence frame shown in FIG. 8. In this example, the referencing phrase is contained in the third sentence frame #T3, and the size of "FIG. 1" is such that the length is less than a half of that of the sentence frame #T3 while the width is more than a half of that of the sentence frame #T3 but not more than that of the sentence frame #T3, which matches with the condition T2, so that there are two candidate positions of a top center of the sentence frame and a bottom center of the sentence frame, as shown in FIGS. 10(A) and 10(B), where the candidate positions appear shaded again.

Next, at the step 704, whether a next sentence frame exists inside the same page frame or not is determined. If the next sentence frame exists inside the same page frame, the process returns to the step 703 in order to generate further candidate positions in that next sentence frame. Otherwise, the step 705 is taken next. In this example, the next sentence frame is located on the next page frame #P2, so that the next sentence frame does not exist inside the same page frame.

At the step 705, whether there is another figure element already laid out inside the same page frame or not is determined. If such another figure element does not exist, the process terminates, whereas otherwise the step 706 will be taken. In this example, no other figure element is laid out in this page frame #P1, so that the process terminates after the step 705.

Figure 11:
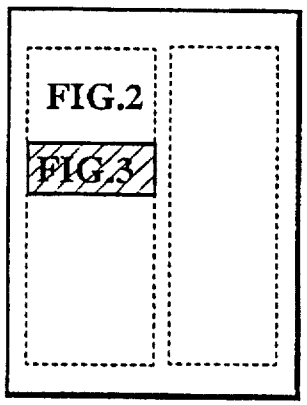
FIGS. 11(A), 11(B) and 11(C) are illustrations of examples of candidate layout positions with respect to the other figure element, generated by the layout position candidate generation unit of the apparatus of FIG. 1.
Figure 11:
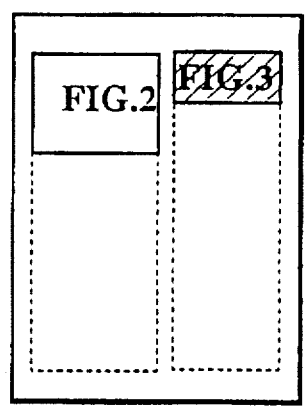
Figure 11:
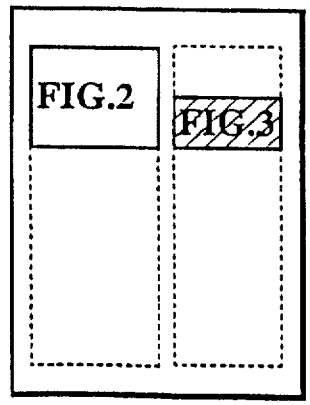

At the step 706, the candidate positions in relation to the already laid out figure element are generated, by comparing the size of a new figure element and the size of the already laid out figure element, according to a set of rules for layout in relation to already laid out figure element shown in FIG. 8. For example, in laying out "FIG. 3" to the page frame in which "FIG. 2" has already been laid out, if the size of "FIG. 3" is such that the length is less than a half of that of "FIG. 2" while the width is more than a half of that of "FIG. 2" but not more than that of "FIG. 2", which matches with the condition F2, then there are three candidate positions of an immediately below the already laid out figure element, an upper right with respect to the already laid out figure element, and a lower right with respect to the already laid out figure element, as shown in FIGS. 11(A), 11(B), and 11(C), where the candidate positions appear shaded again.

Next at the step 707, whether there is still another figure element already laid out inside the same page frame or not is determined. If such another figure element does not exist, the process terminates, whereas otherwise the process returns to the step 706 in order to generate further candidate positions in relation to that still another already laid out figure element inside the same page frame.

When this candidate position generation process is completed, all the candidate positions generated in the course of this process are sent to the layout result estimation unit 10. In a case of the example of the document data of FIGS. 2(A) and 2(B) and the region data of FIG. 3, six candidate positions shown in FIGS. 9(A), 9(B), 9(C), 9(D), 10(A), and 10(B) are sent to the layout result estimation unit 10.

Figure 12:
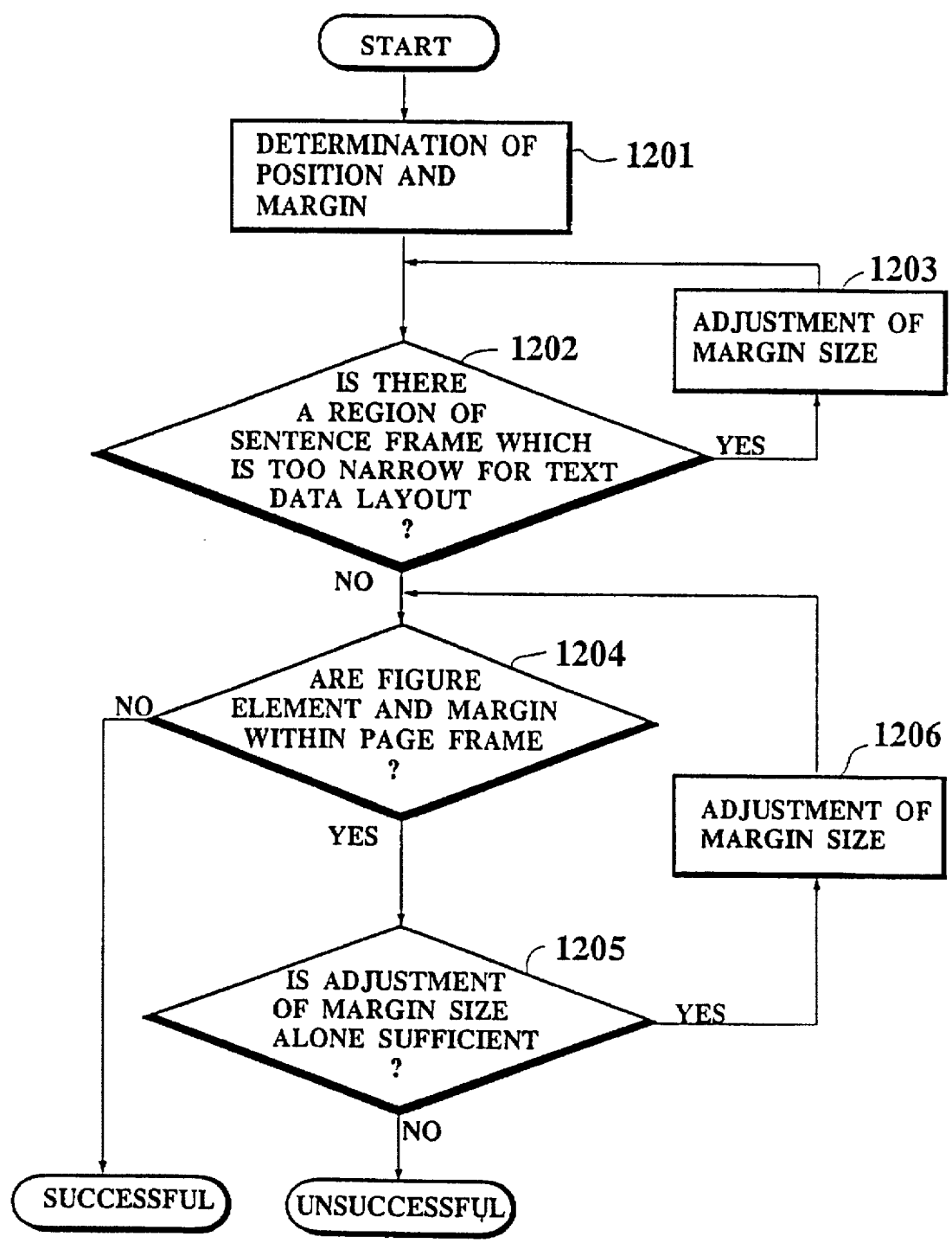
FIG. 12 is a flow chart for a candidate layout estimating operation by a layout result estimation unit of the apparatus of FIG. 1.

The layout result estimation unit 10 estimates the overall layout resulting from each candidate position for "FIG. 1", by using the coordinates of the layout positions and margin sizes determined from the candidate positions and sizes of the letter font used for the surrounding text data, according to the flow chart of FIG. 12, as follows.

Figure 13:
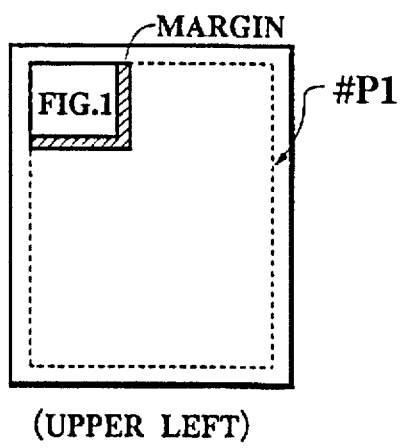
FIGS. 13(A), 13(B), 13(C), 13(D), 13(E) and 13(F) are illustrations of the candidate layouts estimated by the layout result estimation unit of the apparatus of FIG. 1.
Figure 13:
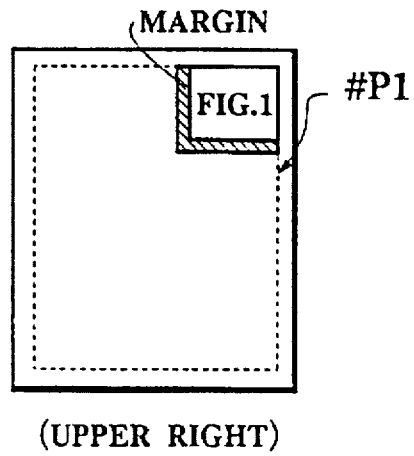
Figure 13:
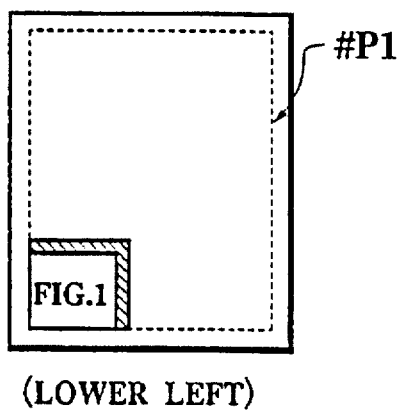
Figure 13:
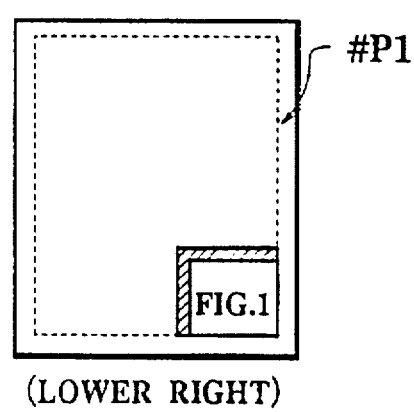
Figure 13:
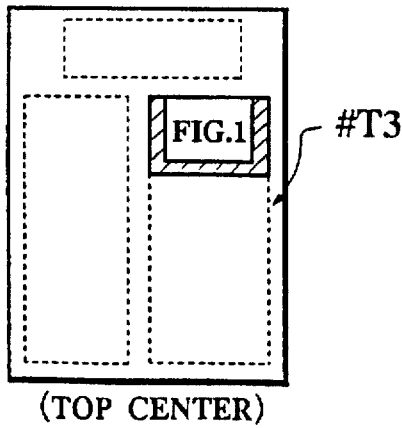
Figure 13:
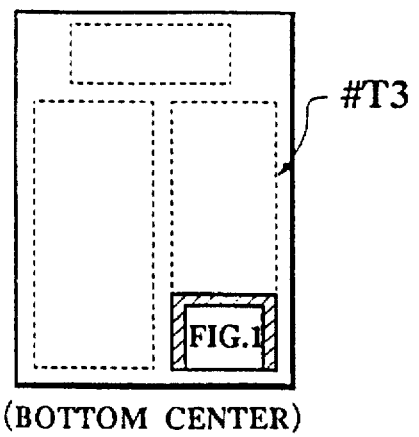

First, at the step 1201, a position of the figure element to be laid out and a margin to be formed around the figure element is determined. Namely, for those candidate positions which are specified to be on a corner, such as the candidate positions of FIGS. 9(A), 9(B), 9(C), and 9(D), a frame of the figure element to be laid out is superposed on the sentence frame at an appropriate corner without a margin, such that the margin of a size based on a standard letter size is formed along edges of the figure element which are located away from the corner, as shown in FIGS. 13(A), 13(B), 13(C), and 13(D), where the margin appears shaded. On the other hand, for those candidate positions which are specified to be on a top or bottom center, such as the candidate positions of FIGS. 10(A) and 10(B), a middle line of a frame of the figure element to be laid out is superimposed over a middle line of the sentence frame, such that the margin of a size based on a standard letter size is formed along edges of the figure element except for a specified top or bottom edge, as shown in FIGS. 13(E) and 13(F), where the margin appears shaded again.

Figure 14:
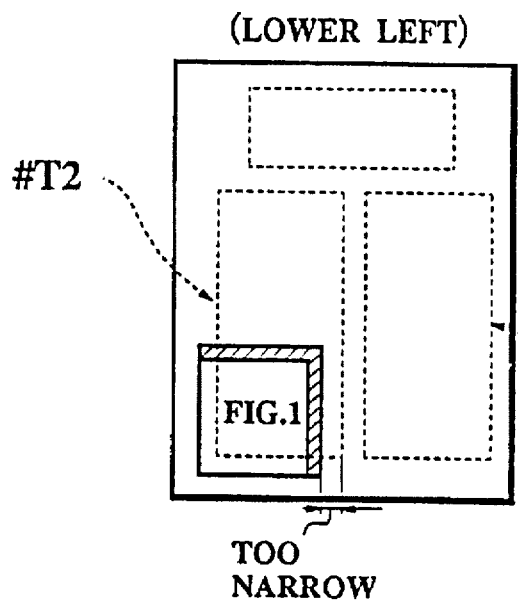
FIGS. 14(A) and 14(B) are illustrations of cases in which the adjustment of margin size is necessary.
FIGS. 14(C) and 14(D) are illustrations of the results of adjustment of margin size for the cases of FIGS. 14(A) and 14(B), respectively.
Figure 14:
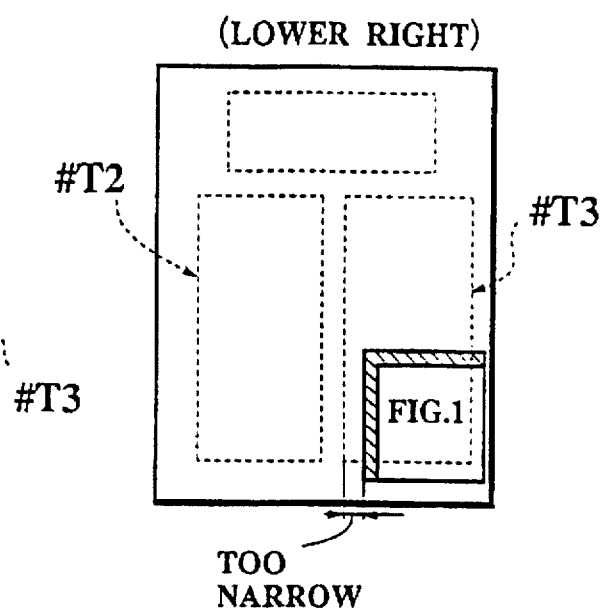
Figure 14:
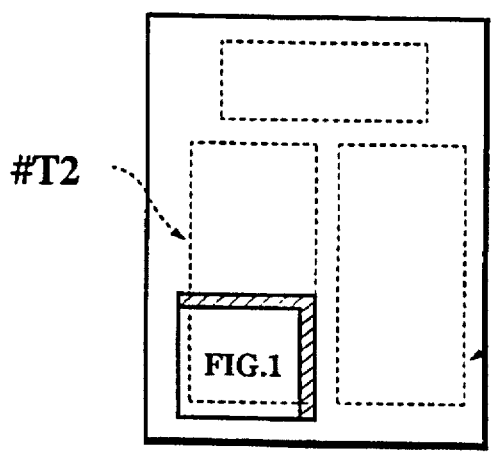
Figure 14:
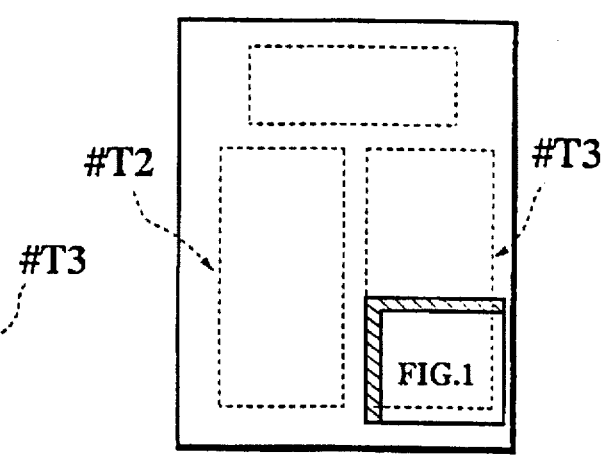

Next, at the step 1202, whether there is a region of the sentence frame which becomes too narrow for laying out the text data as a result of the margin determined at the step 1201 is checked. Namely, the layouts at corners, such as those of FIGS. 13(C) and 13(D), may leave a narrow stripe of a region in the sentence frame which is too narrow for laying out the text data as shown in FIGS. 14(A) and 14(B). In such a case, next at the step 1203, the size of the margin is adjusted to eliminate such an inappropriately narrow region in the sentence frame, as shown in FIGS. 14(C) and 14(D).

Next, at the step 1204, whether or not the laid out figure element and margin are within the page frame is checked. When the figure element and margin are completely within the page frame, such a layout is judged to be a successful one and the process terminates. Otherwise, next at the step 1205, whether the adjustment of the margin size alone is sufficient to place the entire figure element and margin within the page frame or not is determined. In a case in which only a part of the margin is located outside the page frame, the adjustment of the margin size is sufficient, so that next at the step 1206 the margin size is adjusted to place the entire figure element and margin within the page frame, and the process returns to the step 1204. Otherwise, when a part of the figure element itself is located outside the page frame, adjustment of the margin size alone is not sufficient, so that the such a layout is judged to be an unsuccessful one and the process terminates.

When the estimation of the layout results is completed by the layout result estimation unit 10, the layout status evaluation unit 11 evaluates each layout result according to the prescribed evaluation items such as those shown in FIG. 15. Namely, according to FIG. 15, the following seven items are to be checked in evaluating each layout result.

1. Is it placed within the page frame?
2. Is it not overlapping with the previously laid out figure element?
3. Is it not overlapping with the other sentence frames assigned to different logical attributes?
4. Can the referencing phrase be placed on the same page?
5. Is it not placed at a position where the order of figure elements is reversed, with respect to the previously laid out figure element?
6. Is it not dividing the sentence frame in parts?
7. In a case a remaining space of the sentence frame on that page is small, is it placed at a bottom of that sentence frame containing the referencing phrase?

Figure 16:
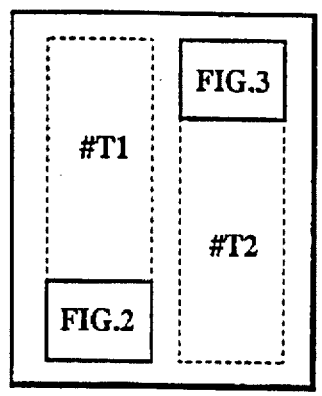
FIGS. 16(A), 16(B), 16(C), 16(D) and 16(E) are illustrations of situations for which an evaluation item in the table of FIG. 15 regarding a reversal of an order of figure elements becomes relevant.
Figure 16:
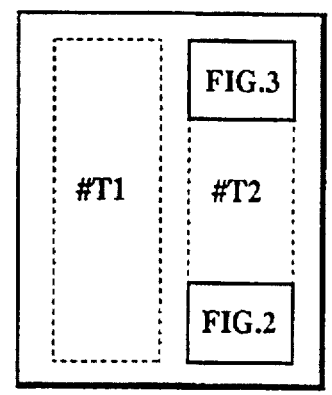
Figure 16:
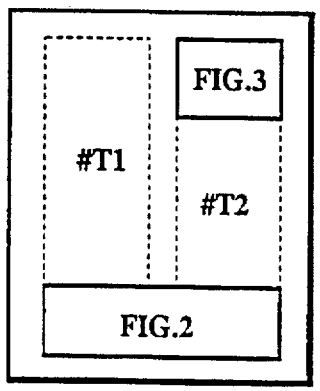
Figure 16:
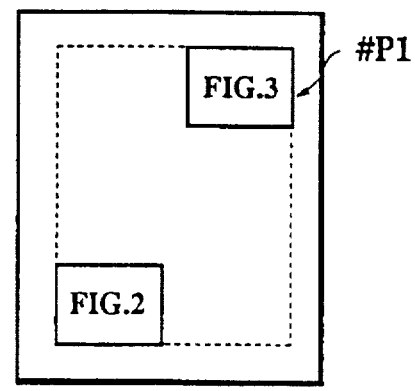
Figure 16:
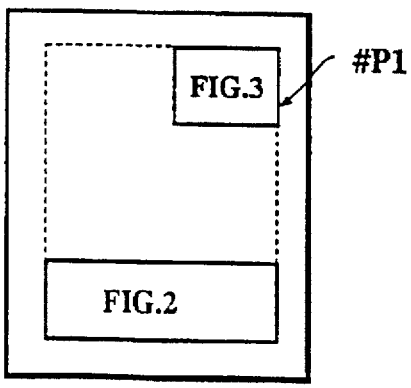

Among these evaluation items, the fifth item regarding the reversal of the order of the figure elements becomes relevant in the situations such as those shown in FIGS. 16(A) to 16(E). Namely, this evaluation item is relevant in placing more than one figure elements on the same page, and checks whether the figure elements appears in an order by which their referencing phrases occur in the text data. Here, it is sufficient that the figure elements appear in the correct order along the sentence frames in a direction of reading the text data. Thus, in this embodiment, the situations of FIGS. 16(A) and 16(C) are considered as the layouts in which the figure elements are correctly ordered, while the situations of FIGS. 16(B), 16(D) and 16(E) are considered as the layouts in which the order of the figure elements is reversed.

Figure 17:
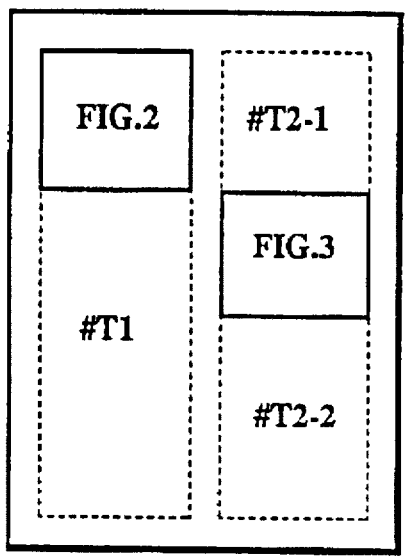
FIGS. 17(A) and 17(B) are illustrations of situations for which an evaluation item in the table of FIG. 15 regarding dividing of a sentence frame by figure elements becomes relevant.
Figure 17:
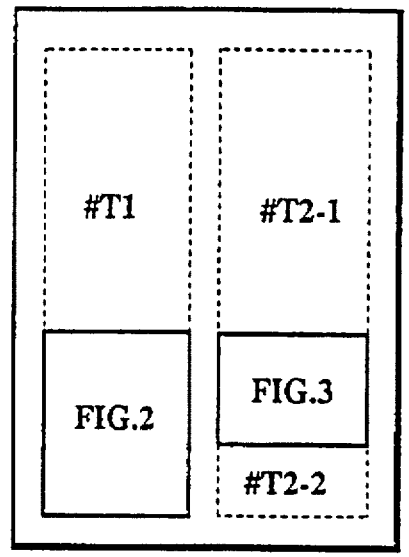

As for the sixth item regarding the dividing of the sentence frame, this evaluation item checks the situations such as those shown in FIGS. 17(A) and 17(B) in which the text data region of sentence frame appears to be divided into pieces by the figure elements.

Figure 18:
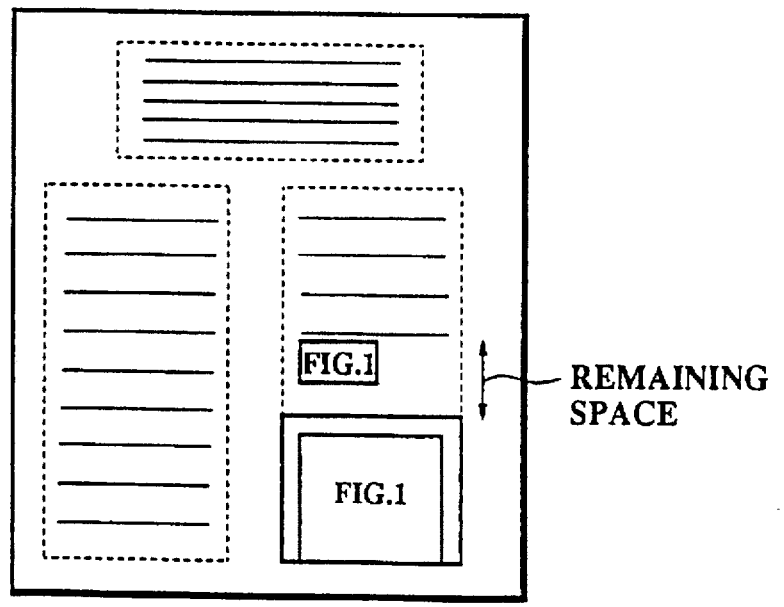
FIG. 18 is an illustration of a situation for which an evaluation item in the table of FIG. 15 regarding a case of small remaining space in a sentence frame becomes relevant.

As for the seventh item, it checks the presence of the figure element at a bottom of the sentence frame containing the referencing phrase in a case such as that shown in FIG. 18 where the remaining space of that sentence frame on that page is small. Namely, in general, the figure element is not likely to be placed at a bottom of the sentence frame, because this positioning prevents the layout of any other figure element in the same sentence frame thereafter. This is particularly true when the remaining space of that sentence frame is large, in which case, the other referencing phrase for the other figure element may appear in the remaining space. However, in the case the remaining space of that sentence frame is small, it is often preferable to place the figure element at the bottom of the sentence frame from a point of view of balance. Now, in such a case, it is highly unlikely that the other referencing phrase for the other figure element may appear in the remaining space, so that only in such a case, the figure element may be placed at the bottom of the sentence frame without causing other problem. The seventh item checks the occurrence of such a situation.

The result of evaluation according to these evaluation items of FIG. 15, applied to the six candidate layouts of FIGS. 13(A) to 13(F), is summarized in the table shown in FIG. 19. A circle in each entry indicates that the item of that entry is satisfied by the layout of that entry.

In FIG. 19, the first three items are considered particularly important, so they are classified as first rate evaluation items, while the other four items are classified as less important, second rate evaluation items.

The unsatisfactory candidate layout elimination unit 12 then eliminates those candidate layouts which are considered unsatisfactory as final candidate layouts. In this embodiment, those candidate layouts which fail to satisfy any one of the first rate evaluation items are considered unsatisfactory as final candidate layouts, and are eliminated at this point. Thus, two candidate layouts of the page frame upper left corner and the page frame upper right corner, corresponding to the layouts of FIGS. 13(A) and 13(B), are eliminated as unsatisfactory at this point.

The candidate order determination unit 13 then determines the order of preference among the remaining candidate layout, according to rules for the candidate order determination shown in FIG. 20. Namely, according to FIG. 20, those candidate layouts in which the figure element is placed in relation to the other already laid out figure elements are considered more preferable than those candidate layouts in which the figure element is placed with respect to the sentence frame. Those candidate layouts in which the figure element is placed with respect to the sentence frame are considered preferable to those candidate layouts in which the figure element is placed with respect to the page frame. Among the candidate layouts belonging to the same one of these three categories, the order is determined by a number of the second rate evaluation items satisfied by each candidate layout. Thus, for the candidate layouts of FIGS. 13(C), 13(D), 13(E), and 13(F), the order of preference shown in FIG. 19 can be determined by the candidate order determination unit 18.

Information such as the layout position coordinates, margin size, and order of preference on the candidate layouts remaining at this point is sent to the candidate selection control unit 14.

At the candidate selection control unit 14, the information on the layout position coordinates and margin size of each candidate layout is sequentially sent to the display control unit 5, according to the order of preference, such that each candidate layout can be displayed on the display unit 6 in an actual form of the layout result. For the candidate layouts of FIGS. 13(A) to 13(F), the first candidate layout is that of the sentence frame top center according to FIG. 19, so that the layout result shown in FIG. 5(B) is displayed on the display unit 6 first.

Figure 21:
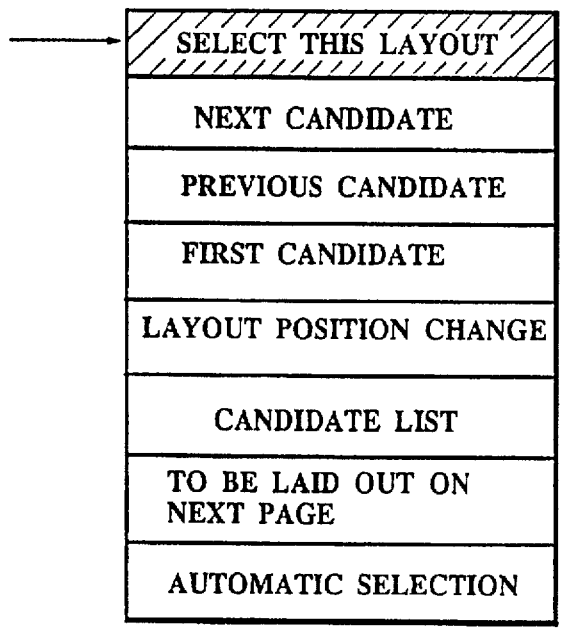
FIG. 21 is an illustration of a candidate selection menu provided by an operator selection input unit of the apparatus of FIG. 1.

The operator watching the display on the display unit 6 then makes his choice of the layout by using the operator selection input unit 15, which provides a candidate selection menu in a form shown in FIG. 21 from which the operator selects a desired menu entry in order to perform the candidate selection operation.

In the candidate selection menu of FIG. 21, a menu entry "SELECT THIS LAYOUT" is to be selected by the operator when the operator is choosing the candidate layout currently displayed on the display unit 6 as his final choice. When this menu entry is selected, the information on the layout position coordinates and margin size of this layout is sent to the document formatting unit 4 through the candidate selection control unit 14, so as to continue the document formatting process by using this layout.

A menu entry "NEXT CANDIDATE" is to be selected in displaying the next candidate layout in the order of preference. Thus, the candidate layouts can be displayed sequentially in a descending their order of preference by repeatedly selecting this menu entry. When this menu entry is selected while the candidate layout of the lowest order of preference is being displayed, the operator is notified of the last candidate layout, and the display of the first candidate layout is resumed on the display unit 6.

A menu entry "PREVIOUS CANDIDATE" is selected in displaying the previous candidate layout in the order of preference. Thus, the candidate layouts can be displayed sequentially in an ascending order of their order of preference by repeatedly selecting this menu entry. When this menu entry is selected while the candidate layout of the highest order of preference is being displayed, the operator is notified that this is the first candidate layout.

A menu entry "FIRST CANDIDATE" is to be selected in displaying the first candidate layout in the order of preference.

A menu entry "LAYOUT POSITION CHANGE" is to be selected in manually specifying the change of the layout position to a position not offered by the candidate layouts. When this menu entry is selected, a frame of the figure element to be laid out appears on the display of the already laid out document data such as that shown in FIG. 5(A). This frame of the figure element can be freely moved by the operator on the display of the already laid out document data by using a mouse. When the frame of the figure element is moved to a desired position, the candidate selection control unit 14 calculates the appropriate margin size and displays the layout result on the display unit 6. Here, the margin may also be specified by the operator. The operator may returns to the candidate layouts by selecting the menu entry "FIRST CANDIDATE" after selecting this menu entry "LAYOUT POSITION CHANGE".

Figure 22:
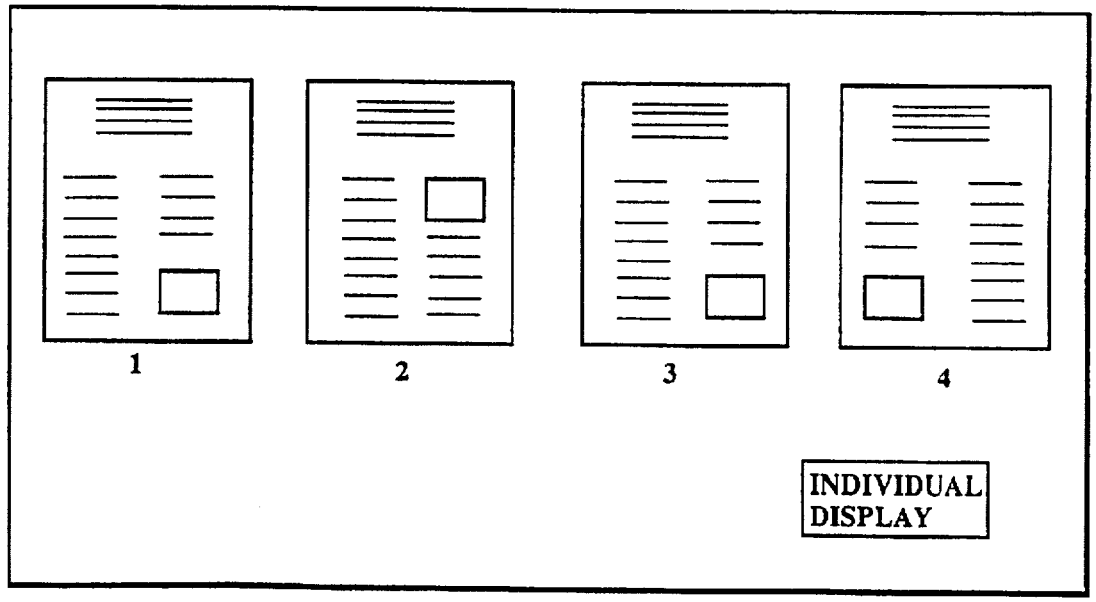
FIG. 22 is an illustration of a display for a candidate layout selection operation, displaying a group of the candidate layouts together on a single display.

A menu entry "CANDIDATE LIST" is to be selected in displaying all the candidate layouts together on a single display. When this menu entry is selected, contracted images of all the candidate layouts are displayed together, in an arrangement according to the order of preference, as shown in FIG. 22, where the order of preference is also displayed below each candidate layout. When the number of candidate layouts are too numerous for displaying all of the candidate layouts together in this manner, the candidate layouts may be divided into groups, where each group are displayed together in the manner described above, and the operator is provided with means for selecting the groups to be displayed. The operator may returns to the individual candidate layout display mode by selecting an entry "INDIVIDUAL DISPLAY" on the "CANDIDATE LIST" display, as shown in FIG. 22.

A menu entry "TO BE LAID OUT ON NEXT PAGE" is to be selected when the operator decides to place the figure element on the next page. When this menu entry is selected, the document formatting operation is continued to the end of the current page, and the layout of figure element is determined when the document formatting process proceeds to the next page.

A menu entry "AUTOMATIC SELECTION" is to be selected when the first candidate layout is to be selected in all the subsequent layouts of the remaining figure elements automatically, so as to reduce the demand on the operator.

These menu entries of the candidate selection menu may be simplified, for example, for accommodating just the selection from the candidate list of FIG. 22. Here, the order of preference of each candidate layout and, preferably also a total number of the candidate layouts, are displayed along with each candidate layout.

Alternatively, the candidate selection control unit 14 may facilitate the operator's candidate selection operation by displaying all the candidate layout positions in the form of line frames over the display of the already laid out document data, as shown in FIG. 23, where the first candidate layout position is indicated by a bold solid line, the second candidate layout position is indicated by a thin solid line, and a third candidate layout position is indicated by a dashed line, and so on. The frames may also be accompanied by numerals indicating the order of preference of each candidate layout position.

Thus, according to this embodiment, the document formatting process can be performed, with the preference of the operator and overall balance taken into account, so that the desired formatting can be obtained efficiently without tedious post-processing operations and detailed expert knowledge on document formatting or master maneuvering by the operator.

It is to be noted that although the above embodiment has been described for a case of formatting the document including both text data and figure data, the present invention can also be applied to a case of formatting a document including Just figure data or just image data.

Besides these, many modifications and variations of the above embodiments may be made without departing from the novel and advantageous features of the present invention. Accordingly, all such modifications and variations are intended to be included within the scope of the appended claims.

What is claimed is:

1. An apparatus for formatting a document including text data representing text elements of the document and non-text data representing non-text elements of the document, comprising:

means for setting up layout data indicating a layout frame for laying out the document; and means for automatically formatting the document by consecutively laying out the text data in the layout frame according to a prescribed procedure for formatting the text elements, while laying out the non-text data in the layout frame in relation to the text data by monitoring a current status of an overall spatial layout of the text data which indicates how the text data is currently laid out in the layout frame, and determining a layout position for each non-text element in view of an overall balance of the text data and the non-text data based on mutual relationships among the text data and the non-text data, according to said current status of said overall spatial layout of the text data.

2. The apparatus of claim 1, wherein the formatting means automatically determines the layout position for each non-text element as one of prescribed candidate layout positions having a highest order of preference among those prescribed candidate layout positions which are compatible with said current status of said overall spatial layout of the text data.

3. A method for formatting a document including text data representing text elements of the document and non-text data representing non-text elements of the document, comprising the steps of:

setting up layout data indicating a layout frame for laying out the document; and automatically formatting the document by consecutively laying out the text data in the layout frame according to a prescribed procedure for formatting the text elements, while laying out the non-text data in the layout frame in relation to the text data by monitoring a current status of an overall spatial layout of the text data which indicates how the text data is currently laid out in the layout frame, and determining a layout position for each non-text element in view of an overall balance of the text data and the non-text data based on mutual relationships among the text data and the non-text data, according to said current status of said overall spatial layout of the text data.

4. The method of claim 3, wherein at the formatting step, the layout position for each non-text element is automatically determined as one of prescribed candidate layout positions having a highest order of preference among those prescribed candidate layout positions which are compatible with said current status of said overall spatial layout of the text data.

5. An apparatus for formatting a document including text data representing text elements of the document and non-text data representing non-text elements of the document, comprising:

means for setting up layout data indicating a layout frame for laying out the document; and means for automatically formatting the document by laying out the text data in the layout frame, while laying out the non-text data in the layout frame according to the layout data at positions satisfying prescribed criteria with respect to layout positions of the non-text data already laid out in the layout frame and layout positions of related portions of the text data already laid out in the layout frame, where the prescribed criteria define an overall balance of the text data and the non-text data based on mutual relationships among the text data and the non-text data.

6. The apparatus of claim 5, wherein the formatting means automatically lays out each non-text element at a layout position which is one of prescribed candidate layout positions having a highest order of preference among those prescribed candidate layout positions which are suitable in relation to the related portions of the text data already laid out in the layout frame.

7. The apparatus of claim 5, wherein the related portions of the text data for each non-text data represent text elements which explicitly refer to a non-text element of said non-text data.

8. A method for formatting a document including text data representing text elements of the document and non-text data representing non-text elements of the document, comprising the steps of:

setting up layout data indicating a layout frame for laying out the document; and automatically formatting the document by laying out the text data in the layout frame, while laying out the non-text data in the layout frame according to the layout data at positions satisfying prescribed criteria with respect to layout positions of the non-text data already laid out in the layout frame and layout positions of related portions of the text data already laid out in the layout frame, where the prescribed criteria define an overall balance of the text data and the non-text data based on mutual relationships among the text data and the non-text data.

9. The method of claim 8, wherein the formatting step automatically lays out each non-text element at a layout position which is one of prescribed candidate layout positions having a highest order of preference among those prescribed candidate layout positions which are suitable in relation to the related portions of the text data already laid out in the layout frame.

10. The method of claim 8, wherein the related portions of the text data for each non-text data represent text elements which explicitly refer to a non-text element of said each non-text data.

* * * * *